United States Patent
Shirasaki

Patent Number: 5,274,495
Date of Patent: Dec. 28, 1993

[54] OPTICAL AMPLIFIER

[75] Inventor: Masataka Shirasaki, Kawasaki, Japan

[73] Assignee: Fujitsu Limited, Kawasaki, Japan

[21] Appl. No.: 856,913

[22] PCT Filed: Sep. 17, 1991

[86] PCT No.: PCT/JP91/01232
§ 371 Date: May 18, 1992
§ 102(e) Date: May 18, 1992

[87] PCT Pub. No.: WO92/05466
PCT Pub. Date: Apr. 2, 1992

[30] Foreign Application Priority Data

Sep. 18, 1990 [JP] Japan .................. 2-246358

[51] Int. Cl.$^5$ .................. G02B 6/26; G02F 1/35
[52] U.S. Cl. .................. 359/330; 359/341; 372/22; 385/1
[58] Field of Search .......... 359/244, 299, 326, 329, 359/330, 341; 385/1; 372/21, 22

[56] References Cited
U.S. PATENT DOCUMENTS

| | | | |
|---|---|---|---|
| 3,875,422 | 4/1975 | Stolen | 359/330 |
| 4,867,518 | 9/1989 | Stamnitz et al. | 359/341 |
| 4,962,987 | 10/1990 | Doran | 350/341 |
| 5,076,658 | 12/1991 | Hayden | 385/1 |

FOREIGN PATENT DOCUMENTS 0297076 1/1989
62-186234 8/1987 Japan .
9205466 4/1992 World Int. Prop. O. .

OTHER PUBLICATIONS

Chen, Y.; Opt. Sci. Centri S. Opt Soc. Am. B. Opt Phys., vol. 7, #1, pp. 43-52, Jan. 1990, abst only provided.

Lin et al.; Opt. Lett., vol. 6, #10, pp. 493-495, Oct. 1981.

Brunner et al.; Appl. Phys., vol. 20, pp. 319-323, Dec. 4, 1979.

Horduik et al.; Appl. Phys. Lett., vol. 18, #10, May 15, 1971, pp. 448-450.

Primary Examiner—Nelson Moskowitz
Attorney, Agent, or Firm—Staas & Halsey

[57] ABSTRACT

An optical amplifier is disclosed which, in an optical amplifier adapted such that signal light and pump light are propagated through an optical waveguide structure (2, 2') therein made of an optically nonlinear material to thereby achieve optical parametric amplification or four-wave mixing optical amplification of the signal light, is provided with means for attenuating idler light to be generated within the optical waveguide structure. The optical amplifier has an advantage that phase matching between the pump light and the signal light is easily achieved and thus an optical amplifier operative over a broad frequency band can be realized.

18 Claims, 3 Drawing Sheets

OPTICAL AMPLIFIER

BACKGROUND OF THE INVENTION

1. Field of the Invention

The present invention relates in general to an optical amplifier on the principle of optical parametric amplification or four-wave mixing optical amplification, and more particularly to an optical amplifier in which phase matching between signal light and pump light is easily achieved and, hence, effective optical amplification of the signal light can be obtained over a broad frequency band.

2. Description of the Related Art

Optical amplifiers of the type in which the amplitude of electric field of light is directly amplified are applicable to the following uses in the optical fiber transmission system, and of late, intense research on the optical amplifiers of this type is being made in various areas:

(A) Use for increasing optical output of a light source: By increasing the output of a light source of the signal light in an optical transmitter, the transmission distance can be increased. When the optical amplifier is used for the light source of local light in an optical receiver on a coherent optical wave communication system, the reception sensitivity can be improved.

(B) Use for a preamplifier in an optical receiver: By performing optical amplification in the stage immediately before the photoelectric conversion stage, the reception sensitivity can be improved.

(C) Use for an optical repeater: By the direct amplification of light, as compared with the method in a conventional optical repeater in which a light signal is once photo-electrically converted into an electric signal and then the electric signal is amplified, it becomes possible to make the repeater itself smaller in size and also to increase the repeater-to-repeater distance.

There has been known an optical amplifier in which optical parametric amplification of signal light is achieved by nonlinear effect of second order obtained when signal light and pump light are propagated through an optical waveguide structure made of a non-linear optical material.

There has also been known an optical amplifier in which four-wave mixing optical amplification of signal light is achieved by nonlinear effect of third order obtained when signal light and pump light are propagated through an optical waveguide structure made of a non-linear optical material.

However, such conventional optical amplifiers have had a disadvantage that phase matching between the signal light and the pump light is not always easily achieved therein and, hence, effective optical amplification of the signal light is obtained only within a narrow frequency band.

Accordingly, an object of the present invention is to provide an optical amplifier in which phase matching between the signal light and the pump light is easily achieved and, hence, effective optical amplification of the signal light can be obtained over a broad frequency band.

SUMMARY OF THE INVENTION

Viewed from an aspect, the present invention provides an optical amplifier adapted such that signal light and pump light are propagated through an optical waveguide structure therein having a core with a relatively high refractive index and a clad with a relatively low refractive index, at least the core exhibiting a non-linear response of second order, to thereby achieve optical parametric amplification of the signal light, characterized by idler light attenuation means for attenuating idler light, which is generated in the process of optical parametric amplification, within the optical waveguide structure.

Viewed from another aspect, the present invention provides an optical amplifier adapted such that signal light and pump light are propagated through an optical waveguide structure therein having a core with a relatively high refractive index and a clad with a relatively low refractive index, at least the core exhibiting a non-linear response of third order, to thereby achieve four-wave mixing optical amplification of the signal light, characterized by idler light attenuation means for attenuating idler light, which is generated in the process of four-wave mixing optical amplification, within the optical waveguide structure.

According to a preferred embodiment of the present invention, the core of the optical waveguide structure is doped with an element absorbing the idler light or a compound of the element, and thereby the idler light is caused to attenuate within the optical waveguide structure.

When the wavelength of the idler light is 1.53 $\mu$m, Er (erbium) can be used as the element to absorb the idler light.

According to another preferred embodiment of the present invention, structural parameters of the optical waveguide structure are set so that the frequency of the idler light becomes lower than the cutoff frequency of the optical waveguide structure, and thereby the idler light is caused to attenuate within the optical waveguide structure.

DETAILED DESCRIPTION OF THE PREFERRED EMBODIMENTS

Preferred embodiments of the present invention will be described below with reference to the accompanying drawings.

Figure 1:
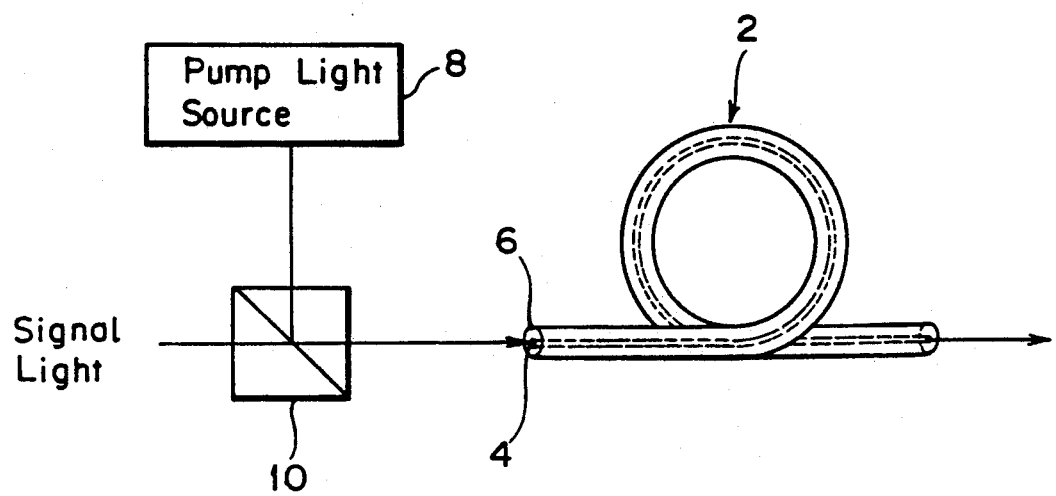
FIG. 1 is a block diagram of an optical amplifier showing a preferred embodiment of the present invention.

FIG. 1 is a block diagram of an optical amplifier showing a preferred embodiment of the present invention. Reference numeral 2 therein denotes an optical waveguide structure for propagating signal light and pump light therethrough. In the present embodiment, the optical waveguide structure 2 is realized by an optical fiber formed of a core 4 having a relatively high index of refraction and a clad 6 disposed around the core 4 having a relatively low index of refraction. Of the optical waveguide structure 2, at least the core through which inlet light propagates is made of such an optically nonlinear material as to produce, in addition to polarization proportional to the electric field of the inlet light, polarization proportional to the square of the electric field (in the case of optical parametric amplification) or polarization proportional to the cube of the electric field (in the case of four-wave mixing optical amplification). As an optically nonlinear material, an isotropic crystal of quartz or the like can be used. An optical fiber made of quartz is easy to manufacture and allows the core to be easily doped with a later described element absorbing idler light.

Pump light from a pump light source 8 is combined with signal light in an optical multiplexer 10 and the signal light and pump light in combination are converged by a lens not shown and introduced into the optical waveguide structure 2 through the end face of its core. As the pump light source 8, a laser diode lasing light at a fixed frequency can be used. As the optical multiplexer 10, an optical coupler of a fiber melt type in which the branching ratio greatly depends on the wavelength or an optical filter in which transmittance or reflectivity greatly depends on the wavelength can be used.

Figure 2:
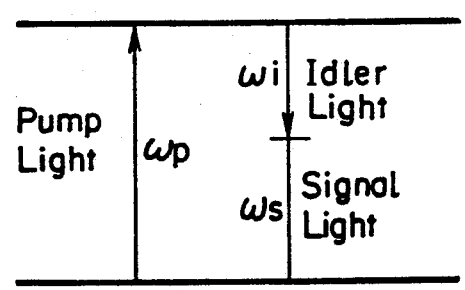
FIG. 2 is a conceptual diagram of optical parametric amplification.

FIG. 2 is a conceptual diagram of the optical parametric amplification depending on nonlinear response of second order. When intense pump light with a constant angular frequency $\omega_p$ and signal light to be amplified with an angular frequency $\omega_s$ ($<\omega_p$) are simultaneously introduced into a medium having nonlinear polarization proportional to the square of the electric field, the signal light with the angular frequency $\omega_s$ is amplified in general by a combination of two different frequency mixing processes with idler light having an angular frequency of $\omega_i = \omega_p - \omega_s$ serving as an intermediary. The energy necessary for the amplification is provided by the pump light. Here, the following relationships are maintained:

$$\omega_p \approx 2\omega_s, \omega_p \approx 2\omega_i.$$

Figure 3:
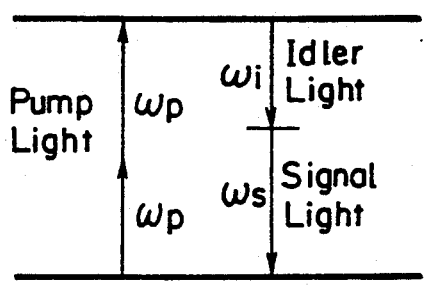
FIG. 3 is a conceptual diagram of four-wave mixing optical amplification.

FIG. 3 is a conceptual diagram of four-wave mixing optical amplification depending on nonlinear response of third order. In this case, the following relationships are maintained among the frequency $\omega_s$ of the signal light, the frequency $\omega_p$ of the pump light, and the frequency $\omega_i$ of the idler light:

$$2\omega_p = \omega_i + \omega_s, \omega_p \approx \omega_s, \omega_p \approx \omega_i.$$

When optical parametric amplification or four-wave mixing optical amplification is performed, phase matching is required to obtain great gain. Since, a means is employed in the present invention for attenuating idler light within the optical waveguide structure, the idler light which has contributed to the optical amplification is caused to quickly attenuate. Accordingly, measures for phase matching between the pump light and the signal light are required to be taken only while the idler light is attenuating. As a result, compared with the case where the phase matching conditions must be satisfied all through the optical waveguide structure, the conditions for achieving the phase matching are greatly relaxed. Therefore, it becomes possible to provide an optical amplifier obtaining great gain over a broad frequency band.

In order to attenuate the idler light within the optical waveguide structure in the optical amplifier shown in FIG. 1, the core 4 is for example doped with an element absorbing the idler light or a compound of the element. When the wavelength of the idler light is around 1.53 $\mu$m, Er (erbium) for example can be used as the element absorbing the idler light. It is easy to dope the core of an optical fiber made of quartz glass with Er.

A manufacturing method of an optical fiber having the core doped with Er for example comprises the following steps:

(A) depositing a soot-like oxide to become the core including the dopant for refractive index adjustment by CVD method (chemical vapor deposition method) within a quartz glass tube to become the clad;

(B) impregnating the soot-like oxide with water solution or alcohol solution of erbium chloride;

(C) evaporating the solvent of the solution;

(D) vitrifying the soot-like oxide including erbium chloride;

(E0) collapsing the quartz glass tube thereby forming a preform; and (F) melting and spinning the preform into an optical fiber.

When erbium is employed as the doping element, the wavelength of the idler light is around 1.53 $\mu$m, and hence, when the wavelength of the signal light to be amplified is previously known, the wavelength of the pump light can be calculated according to the above mentioned relational expressions among angular frequencies.

Figure 4:
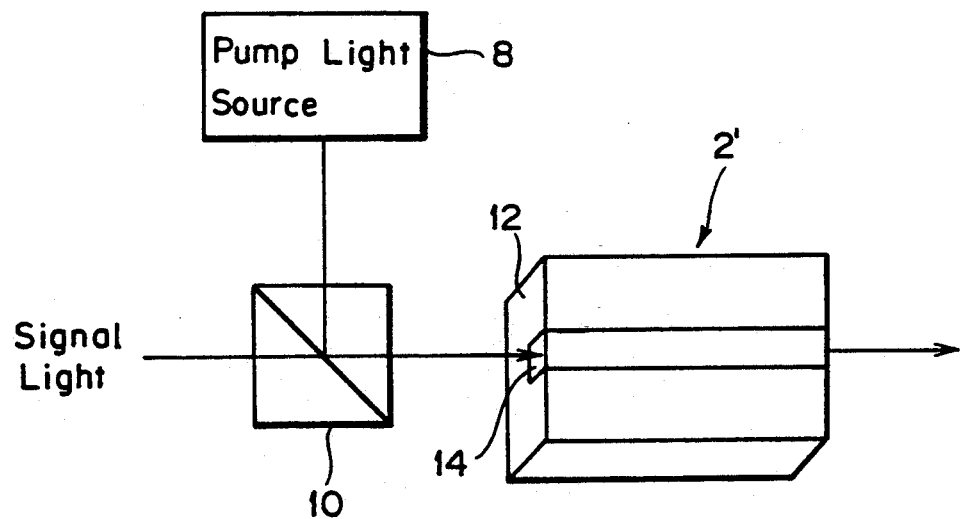
FIG. 4 is a block diagram of an optical amplifier showing another preferred embodiment of the present invention.

FIG. 4 is a block diagram of an optical amplifier showing another preferred embodiment of the present invention. In this embodiment, an optical waveguide structure 2' formed of an optical waveguide chip is employed instead of the optical waveguide structure formed of an optical fiber as in the preceding embodiment. The optical waveguide chip can be obtained by forming a portion with a high refractive index by thermal diffusion or the like on an optical waveguide substrate with a relatively low refractive index and using the portion with a high refractive index as the core 14 and the remaining portion as the clad 12. In order to cause the core 14 to produce an optical nonlinear response, an anisotropic crystal having no center, such as symmetry of LiNbO$_3$ or the like, is used for the optical waveguide substrate. The anisotropic crystal of the described type is suitable for producing a nonlinear effect of second order. It is also possible to use an optical waveguide chip made of quartz glass.

In this embodiment, by arranging the frequency of the idler light to be lower than the cutoff frequency in the optical waveguide structure 2', the idler light contributed to the optical amplification is adapted to quickly attenuate within the optical waveguide structure. More specifically, when optical parametric amplification or four-wave mixing optical amplification is performed by an optical amplifier shown in FIG. 4, the cutoff angular frequency $\omega_c$ is set to satisfy the following relationship $$\omega_i < \omega_c < \omega_s.$$

The cutoff frequency can be set by adjusting structural parameters such as the difference between specific refractive indexes of the core and the clad, and the like.

Since the relationships among frequencies of the signal light, pump light, and idler light are the same as those in the preceding embodiment, explanation thereof will be omitted.

According to the present embodiment, the idler light generated within the core 14 is brought into a leakage mode to attenuate quickly. Accordingly, the phase matching between the pump light and the signal light becomes easy and, thus, an optical amplifier having great gain over a broad frequency band can be realized.

In the structure shown in FIG. 1, it may also be arranged such that the frequency of the idler light is set lower than the cutoff frequency of the optical fiber to thereby attenuate the idler light generated within the core of the optical fiber.

In the structure shown in FIG. 4, it may also be arranged such that the core of the optical waveguide chip is doped with an element absorbing the idler light or a compound of the element to thereby attenuate the idler light.

In embodying the present invention, it sometimes occurs that stimulated Brillouin scattering is produced within the core of the optical waveguide structure and thereby the gain of the optical amplifier comes to be restricted. A structure to remedy the trouble will be described below with reference to FIG. 5 and FIG. 6.

Figure 5:
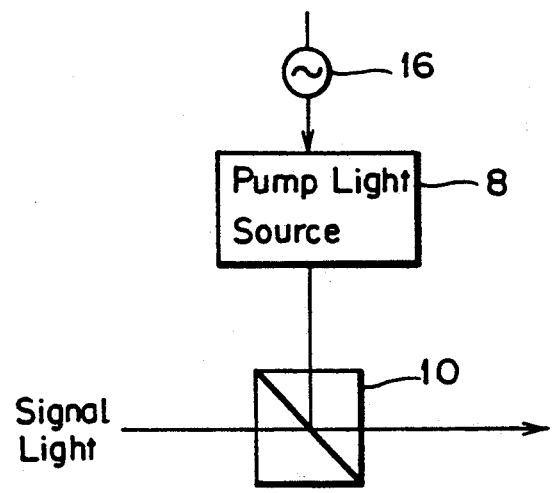
FIG. 5 is a block diagram of a portion of an optical transmitter showing an embodiment in which stimulated Brillouin scattering is suppressed.

In the example shown in FIG. 5, the pump light source 8 outputting the pump light to be introduced into the core of the optical waveguide structure is slightly frequency modulated. More specifically, when the light source 8 is for example a laser diode driven by a stationary current, an AC signal from an oscillator 16 is superimposed on the driving current of the laser diode to thereby frequency modulate the pump light, making use of the phenomenon of the lased frequency in the laser diode to vary with a change in the driving current. By such arrangement, occurrence of the stimulated Brillouin scattering within the core of the optical waveguide structure can be suppressed to thereby remove the restriction on the gain of the optical amplifier.

Figure 6:
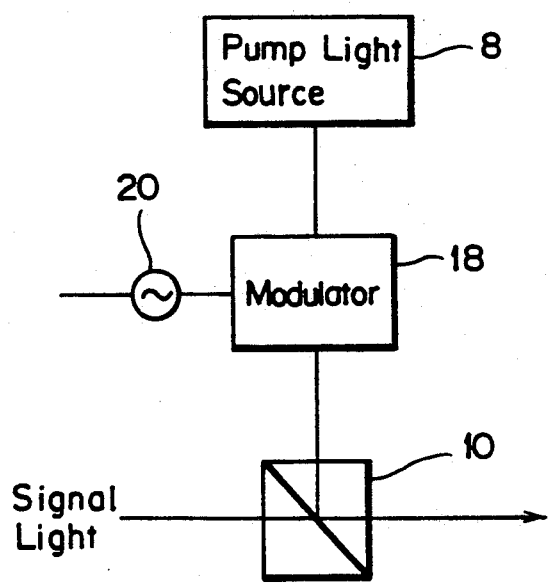
FIG. 6 is a block diagram of a portion of an optical transmitter showing another embodiment in which stimulated Brillouin scattering is suppressed.

In the example shown in FIG. 6, the pump light from the pump light source 8 is arranged to be introduced into the core of the optical waveguide structure through a phase modulator 18. As the phase modulator 18, a Mach-Zehnder optical modulator can be used. In this case, phase modulation of the pump light is achieved by applying an AC voltage signal from an oscillator 20 to the loading electrode of the Mach-Zehnder optical modulator. Also in this example, the stimulated Brillouin scattering within the core, which exhibits an optical nonlinear response, can be effectively suppressed to thereby remove the restriction on the gain of the optical amplifier.

According to the present invention, also because of the interactions within the optical waveguide being all performed between light waves, it becomes possible to broaden the band over which the optical amplification is produced. Further, the optical amplifier according to the present invention produces lower noise than any type of optical amplifiers so far known and therefore signal reception with high sensibility in optical communications etc. can be attained.

Since the optical amplifier according to the present invention as described above has the advantage that phase matching between the pump light and the signal light can be easily achieved therein, it is useful as an optical amplifier usable over a broad frequency band and suitable for amplifying en bloc a plurality of light signals on a frequency-division multiplexing system.

What is claimed is:

1. An optical amplifier comprising:
   an optical waveguide structure through which signal light and pump light are propagated, said optical waveguide structure having a core with a relatively high refractive index and a clad with a relatively low refractive index, at least said core exhibiting a nonlinear response of second order, to thereby achieve optical parametric amplification of said signal light; and
   idler light attenuation means for attenuating idler light, which is generated in the process of optical parametric amplification, said idler light attenuation means being included in said optical waveguide structure.

2. An optical amplifier according to claim 1, wherein said idler light attenuation means is provided by doping said core with an element absorbing the idler light or a compound of said element.

3. An optical amplifier according to claim 2, wherein said element is Er (erbium) and the wavelength of said idler light is 1.53 μm.

4. An optical amplifier according to claim 3, wherein said optical waveguide structure is an optical fiber made of quartz glass.

5. An optical amplifier according to claim 3, wherein said optical waveguide structure is an optical waveguide chip made of $LiNbO_3$.

6. An optical amplifier according to claim 1, wherein said idler light attenuation means is provided by setting structural parameters of said optical waveguide structure so that the frequency of the idler light becomes lower than the cutoff frequency of said optical waveguide structure.

7. An optical amplifier according to claim 6, wherein said optical waveguide structure is an optical fiber made of quartz glass.

8. An optical amplifier according to claim 6, wherein said optical waveguide structure is an optical waveguide chip made of $LiNbO_3$.

9. An optical amplifier according to claim 1, wherein the frequency or phase of said pump light is modulated.

10. An optical amplifier comprising:
    an optical waveguide structure through which signal light and pump light are propagated, said optical waveguide structure having a core with a relatively high refractive index and a clad with a relatively low refractive index, at least said core exhibiting a nonlinear response of third order, to thereby achieve four-wave mixing optical amplification of said signal light; and
    idler light attenuation means for attenuating idler light, which is generated in the process of four-wave mixing optical amplification, said idler light attenuation means being included in said optical waveguide structure.

11. An optical amplifier according to claim 10, wherein said idler light attenuation means is provided by doping said core with an element absorbing the idler light or a compound of said element.

12. An optical amplifier according to claim 11, wherein said element is Er (erbium) and the wavelength of said idler light is 1.53 μm.

13. An optical amplifier according to claim 12, wherein said optical waveguide structure is an optical fiber made of quartz glass.

14. An optical amplifier according to claim 12, wherein said optical waveguide structure is an optical waveguide chip made of $LiNbO_3$.

15. An optical amplifier according to claim 10, wherein said idler light attenuation means is provided by setting structural parameters of said optical waveguide structure so that the frequency of the idler light becomes lower than the cutoff frequency of said optical waveguide structure.

16. An optical amplifier according to claim 15, wherein said optical waveguide structure is an optical fiber made of quartz glass.

17. An optical amplifier according to claim 15, wherein said optical waveguide structure is an optical waveguide chip made of $LiNbO_3$.

18. An optical amplifier according to claim 10, wherein the frequency or phase of said pump light is modulated.

UNITED STATES PATENT AND TRADEMARK OFFICE
CERTIFICATE OF CORRECTION

PATENT NO. : 5,274,495
DATED : December 28, 1993
INVENTOR(S) : Masataka SHIRASAKI It is certified that error appears in the above-indentified patent and that said Letters Patent is hereby corrected as shown below:

<u>Col. 1</u>, line 18, change "system" to --systems--.

<u>Col. 4</u>, line 21, change "(E0" to --(E)--;
        line 45, after "center" insert --of symmetry--; and
        line 46, delete "symmetry of".

Signed and Sealed this

Fourth Day of October, 1994

Attest:

BRUCE LEHMAN

Attesting Officer    Commissioner of Patents and Trademarks